Sept. 29, 1964   D. C. MacCRACKEN, JR., ET AL   3,151,260
ARRANGEMENT FOR INSULATING COIL LEADS AND SPACING
END TURNS IN A DYNAMOELECTRIC MACHINE
Filed Dec. 8, 1959                                    2 Sheets-Sheet 1

INVENTORS
DOUGLAS C. MacCRACKEN JR.
CHARLES J. MELLON
BY *James R. Campbell*
ATTORNEY INVENTORS
DOUGLAS C. MacCRACKEN JR
CHARLES J. MELLON
BY James R. Campbell
ATTORNEY

United States Patent Office 3,151,260
Patented Sept. 29, 1964

3,151,260
ARRANGEMENT FOR INSULATING COIL LEADS AND SPACING END TURNS IN A DYNAMO-ELECTRIC MACHINE
Douglas C. MacCracken, Jr., and Charles J. Mellon, Scotia, N.Y., assignors to General Electric Company, a corporation of New York
Filed Dec. 8, 1959, Ser. No. 858,247
2 Claims. (Cl. 310—43)

The invention described herein relates to dynamoelectric machines and more particularly to an improved arrangement of insulating coil leads and cables extending outwardly from a stator winding, while simultaneously providing permanent spacers between adjacent coil end turns.

The usual steps of assembly followed in constructing motors and generators require that series, pole and cable leads be brazed to provide appropriate connections for machine operation. The areas of brazing must be insulated and according to present practices, this is accomplished by the manual application of tape insulation to the exposed copper parts. In order to firmly anchor the various electrical leads in place after taping, tying cords preferably of resin treated glass roving are used for securing the leads to the coil end turns and/or other parts on the magnetic core or frame of the machine. The primary disadvantage in these practices concerns the high costs attributable to the labor necessary in performing the taping operation. Since the tape must be applied by hand, the hours required for doing so, constitutes a substantial portion of the total man hours devoted toward machine construction. Moreover, the spacing of the turns of tape and application of the proper amount of tension during taping requires considerable skill so that inexperienced personnel cannot effectively perform the work.

Another important drawback inherent in present methods of construction involves the means employed for rigidly securing coil end turns in position. The end turns must be positioned immovably for preventing their displacement when subjected to vibrating and magnetic forces and current practice calls for tying the end turns of coils in either random or form wound machines to resin treated glass ropes or to a metal ring attached to the frame or magnetic core. Spacers also are located between adjacent end turns in some machines for more positively preventing end turn displacement.

The primary objection to the above construction is that the time required to tie individual end turns to a supporting structure and for locating and securing the spacers in position is so great that it also contributes substantially to the total machine cost. Another objection is that in some instances, the insulation shrinks at a greater rate than the glass roving used in tying the various parts to the supporting structure, and as a result, the wedges and other parts become loose, thus presenting the possibility of wedges falling into the operating parts of the machine. Moreover, looseness in the end turn and coil lead structure permits the end turns to move circumferentially and radially in an amount sufficient to chafe the insulation and expose the copper of the coils thus increasing the likelihood of development of short circuits and other factors adverse to machine operation.

The primary object of the our invention therefore is to eliminate the above disadvantages of the prior art by providing a construction which will permit insulating all the various coil and pole and cable leads simultaneously with an insulating compound which also serves the function of permanently spacing the end turns from each other.

In carrying out our invention in one form, we eliminate the disadvantages associated with individually taping the brazed series, pole and cable connections by positioning an initially viscous insulating compound around the exposed copper surfaces of the various brazed connections located within an insulating ring-type mould disposed adjacent the coil end turns. Upon curing or hardening of the viscous compound, all of the connections are provided with a thick layer of insulating material which not only is of high dielectric strength, but also firmly bonds the leads to the insulating substance of which the mould is composed. Another important aspect of the invention made possible by the use of such a mould and insulating compound is that that portion of the compound disposed between adjacent end turns acts as a plurality of interconnected spacing devices which are effective in minimizing end turn displacement when the machine is placed in operation.

The subject matter which we regard as our invention is particularly pointed out and distinctly claimed in the concluding portion of this specification. Our invention, however, both as to organization and method of operation, together with further objects and advantages thereof may best be understood by reference to the following description taken in connection with the accompanying drawings in which:

Figure 1:
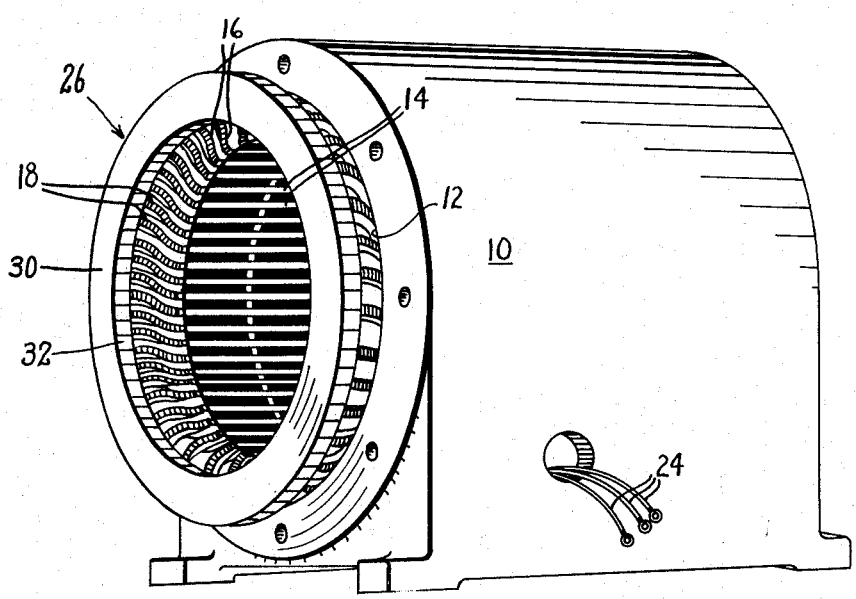
FIGURE 1 is a perspective view of a motor illustrating the disposition of the mould used for containing the various lead connections associated with the magnetic core.

Referring now to the drawings wherein like reference characters designate like or corresponding parts throughout the several views there is shown in FIGURE 1, a frame 10 enclosing a magnetic core 12 comprising a plurality of laminations having slots 14 therein for receiving form wound coils 16. The coils are insulated with appropriate insulation to meet the machine operating temperature requirements and the end turns 18 project outwardly from the core in the usual manner.

In conventional constructions, the coil, pole and cable leads are all located on the same side of the motor and lie around the end turns and in a plane concentric with the core bore so that a relatively large mass of conductors lie in this area. It will be understood that a plurality of groups of coil leads 20 are each connected in series to form poles and pole leads 22 are then joined with cable leads 24 used in supplying power from a remote source to the winding. The leads are joined by brazing with connections being made in accordance with the type of winding used and the character of operation required to be performed by the particular machine. As indicated previously, the leads of prior art constructions must be tied to the end turns or to ring frames or other elements attached to the machine for preventing subsequent movement when subjected to mechanical and magnetic vibratory forces during machine operation. Likewise, the end turns must be braced by wedges or other means for minimizing radial and circumferential displacement. The effort required in manually insulating the various leads, securing them in place, and locating wedges in position entails manufacturing cost problems because of the time required for carrying out these operations in the manufacturing cycle. Equally important is the fact that all of the leads in the area of brazing must be completely insulated and to a degree sufficient to provide the same dielectric strength or protection as that offered by the ground insulation previously applied to the coil body.

Reflection on the manufacturing process indicates that the quality of the machine, as regards this aspect of the construction, is dependent in a large measure on the degree of technical performance of workers engaged in carrying out the operations connected with bracing the end turns and tying and insulating the coil, pole and cable leads. It has been estimated that approximately 50%–60% of motor manufacturing costs is attributable to installation of the coils and tying, bracing and insulating of the end turns and leads. In order to reduce this relatively high cost of construction and provide a machine of higher quality, we locate the uninsulated brazed connections of the coil, pole and cable leads in a mould 26 of insulating material prior to filling the mould with an insulating compound 28 of initially viscous material. In one form of the invention, the mould is designed to encompass a portion of the end turns so that the insulating compound serves the function of both a lead insulator and a spacer for permanently locating the end turns in a predetermined position.

This is accomplished by installing coils in the magnetic core 12 and making the brazed connections in the usual manner except that tape insulation is not applied to the exposed copper in the brazed area of leads and neither the leads nor the end turns are tied or otherwise affixed to any supporting structure. However, after brazing, the leads are placed around and shaped to conform to the end turns and are tied to the end turns for temporarily holding them in a preset position. At this time, the core may or may not be positioned within the stator frame, but in either event, it is located in a vertical position such that it can be lowered toward a mould 26 of a size sufficient to accept the end turns and leads.

Figure 2:
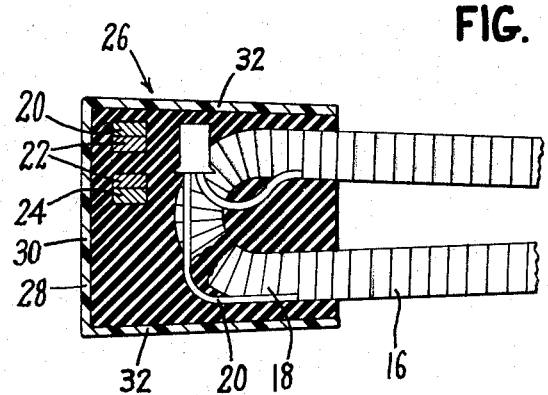
FIGURE 2 is an enlarged sectional view of a portion of the leads and moulds shown in FIGURE 1.

Many different types and configurations of moulds will occur to those skilled in the art but in the preferred form, the mould 26 consists of a U-shaped channel member preferably made of an insulating material such as Textolite, or other compound, which is rigid but still serves an insulating function. As shown in FIGURE 2 the mould comprises a flat base 30 having upstanding side panels 32, all formed to a curvilinear configuration for accepting the leads and end turns of the stator.

When the brazed leads of the stator winding are placed in the mould, the latter is filled with an initially viscous insulating material which flows completely around the leads to encapsulate them and thus insulate the exposed copper at the brazed junctions. The spacing of the lead connections from the mould walls permits providing a build of insulation of sufficient thickness which furnishes the same dielectric strength as that supplied by the ground insulation on the other portions of the coils and cables. Since the mould side panels 32 extend over the end turns, in a direction axially toward the magnetic core, the insulating compound likewise will extend over a portion of the end turns and when it is caused to cure or set into a firm rigid mass, that part of the compound located between adjacent end turns performs the functions of a spacer in prohibiting end turn displacement either in a radial or circumferential direction. In utilizing this kind of encapsulated structure, it is evident that the exposed copper of the brazed connections are completely insulated with a build of insulation more than sufficient to provide the necessary degree of dielectric strength. Also, since the insulating compound cures to a hard substance and is permanently located between the end turns it prevents their displacement when subjected to mechanical and magnetic vibratory forces which otherwise is effective in moving the end turns with respect to each other. This kind of construction eliminates the necessity for individually insulating each of the brazed connections of the leads and also the need for tying and bracing both the leads and end turns.

Figure 3:
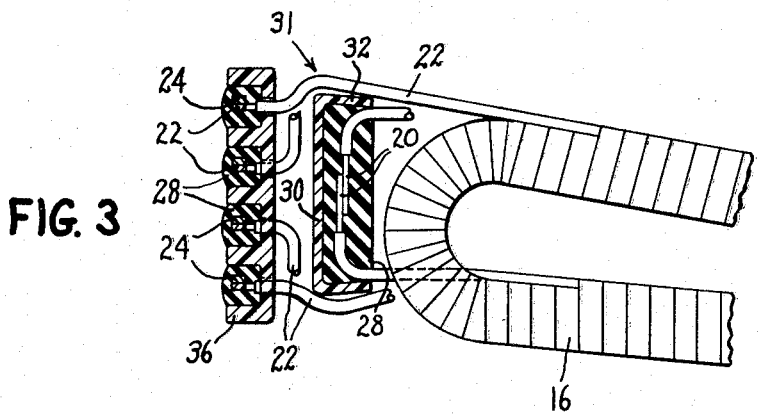
FIGURE 3 is a modification illustrating the moulds spaced from the end turns.

In some installations, it is desirable to remove the mould after it has served its function so that the support offered the end turns and leads is provided by the rigid insulating compound. In such cases, the side panels 32 of the mould are made parallel or bent slightly outwardly for facilitating its removal after the compound cures or sets, rather than having inwardly directed sides which serves to lock the mould permanently in position, as shown in FIGURES 2 and 3. Since the windings are not energized until the mould is removed, it may be made of metal or any other rigid substance which will not adhere to the insulating compound. The particular moulds illustrated and described have a flat base and ends but it will be evident that moulds of other configuration may be used, such as those with a rounded base and/or curved sides, and it may extend a greater or lesser distance over the end turns including abutment with the magnetic core. In the latter case, the compound preferably should be bondable with the iron of the core and have good heat conducting properties. Obviously a similar mould, temporarily or permanently affixed to the structure may be used on the opposite end of the stator core for preventing end turn displacement during operation.

Many different types of insulating compounds can be used for insulating the brazed leads and for providing a spacer between adjacent end turns. Such compounds consist of any of the commercially available resinous materials such as epoxy and polyester resins preferably having fillers of high thermal conductivity such as magnesium oxide or other substances. Silicone and butyl rubbers have been found to be very effective in encapsulating the end turns and leads. It will be evident that in those cases where unsupported rubber materials are used for encapsulating purposes it is desirable to utilize supported rubber tapes which are wrapped around the body of encapsulating material for providing strength to the complete structure.

The modification of FIGURE 3 illustrates an arrangement wherein the moulds are spaced from the end turns for permitting high temperature operation of the motor or for other reasons. To provide for flexibility and economy in the manufacturing cycle, it has been found that a mould of the type illustrated in FIGURE 4, when used in conjunction with the mould in FIGURE 5, is especially effective in insulating all of the brazed connections simultaneously.

Figure 4:
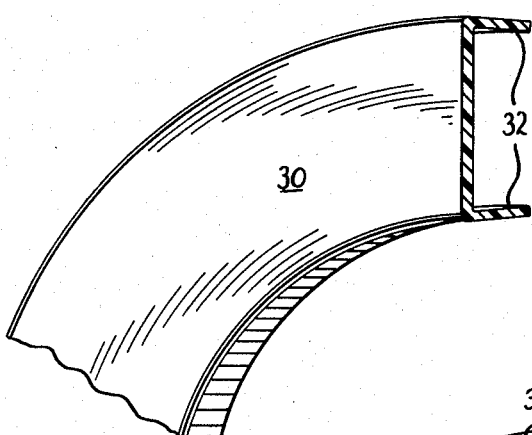
FIGURE 4 is a perspective view of a mould used for receiving the lead connections and insulating compounds to form the construction shown in FIGURES 1-3.
Figure 5:
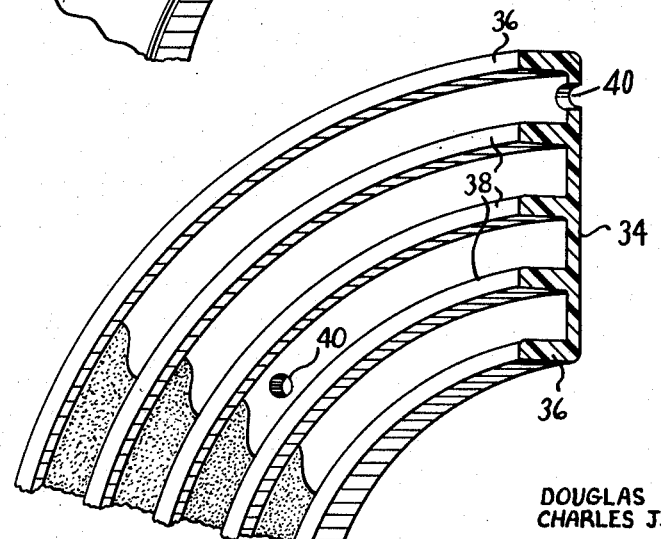
FIGURE 5 is another type of mould used for encapsulating the leads.

As shown in FIGURES 3 and 4, the mould 30 is equipped with inwardly directed side panels 32 which serve to lock the mould in position after the insulating composition is cast in position. In the illustration in FIGURE 3, the coil leads already have been brazed and the insulating material is poured or otherwise injected into the mould and to a thickness sufficient to completely encompass the exposed copper in the brazed area of the leads. When the insulating compound has cured or is completely set and the magnetic core placed in the frame, the insulating compound with its attached mould may be anchored to a portion of the machine frame if desired. The pole and cable leads 22 and 24 are equipped with transverse brazed or crimped connections and the mould of FIGURE 5 is specifically used with these leads. The mould merely consists of a back plate 34 having side panels 36 with spaced rings 38 positioned therebetween to form the construction shown. In order to facilitate entry of leads, bored openings 40 are provided at appropriate points around the mould so that the leads can be introduced thereinto in the manner shown in FIGURE 3. After the leads are set in position and brazed, an insulating compound is introduced into the mould cavities in the manner previously described. When the compound in both moulds sets to a hard substance and the magnetic core placed in the machine frame, the moulds may be secured to the machine frame if desired.

In view of the above, it will be evident that many variations and modifications are possible in light of the above teachings. It therefore is to be understood that within the scope of the appended claims the invention may be practiced other than as specifically described.

What we claim as new and desire to secure by Letters Patent of the United States is:

1. In a magnetic core for a dynamoelectric machine comprising a plurality of laminations having coils therein including coil end turns and leads extending axially outward from said core, means connecting certain of said coil leads in series to form a plurality of groups of coils which when energized establish magnetic poles in said core, a first mould disposed adjacent said end turns and of a depth sufficient to contain said series lead connections, a compound in said mould completely encompassing and insulating said leads and connections, which compound when cured provides insulation for the uninsulated connections, a second mould placed adjacent said first mould, pole leads in said second mould extending from said groups of coils and cable leads adapted for connection to a power source having one end thereof terminating in said mould, brazed connections in said second mould between said pole leads and cable leads, and a compound similar to that in said first mould completely filling said second mould which upon curing provides insulation for the brazed connections and prevents their displacement when the core is placed in operation.

2. In a magnetic core for a dynamoelectric machine comprising a plurality of laminations having coils therein including coil end turns and leads extending axially outward from said core, means connecting certain of said coil leads in series to form a plurality of groups of coils which when energized establish magnetic poles in said core, a first mould disposed adjacent said end turns and of a depth sufficient to contain said series lead connections, a compound in said mould completely encompassing and insulating said leads and connections, which compound when cured provides insulation for the uninsulated connections, a second mould placed adjacent said first mould, pole leads in said second mould extending from said groups of coils and cable leads adapted for connection to a power source having one end thereof terminating in said mould, brazed connections in said second mould between said pole leads and cable leads, said second mould comprising a plurality of aligned channels for accepting the pole and cable leads and including the connections therebetween, and a compound similar to that in said first mould completely filling said second mould which upon curing provides insulation for the brazed connections and prevents their displacement when the core is placed in operation.

References Cited in the file of this patent

UNITED STATES PATENTS

| | | |
|---|---|---|
| 2,583,804 | Andrus | Jan. 29, 1952 |
| 2,749,456 | Luenberger | June 5, 1956 |
| 2,944,297 | Maynard | July 12, 1960 |